(12) United States Patent
Zheng et al.

(10) Patent No.: US 10,243,455 B2
(45) Date of Patent: Mar. 26, 2019

(54) BIDIRECTIONAL DC-DC CONVERTER

(71) Applicant: SANTAK ELECTRONIC (SHENZHEN) CO., LTD., Shenzhen (CN)

(72) Inventors: David Zheng, Shenzhen (CN); Zhongyong Xu, Shenzhen (CN); Zhiwei Liao, Shenzhen (CN); Yusong Ding, Shenzhen (CN); Zhiwu Wang, Shenzhen (CN)

(73) Assignee: SANTAK ELECTRONIC (SHENZHEN) CO., LTD. (CN)

( * ) Notice: Subject to any disclaimer, the term of this patent is extended or adjusted under 35 U.S.C. 154(b) by 0 days.

(21) Appl. No.: 15/546,787

(22) PCT Filed: Jan. 21, 2016

(86) PCT No.: PCT/CN2016/071551
§ 371 (c)(1),
(2) Date: Jul. 27, 2017

(87) PCT Pub. No.: WO2016/124079
PCT Pub. Date: Aug. 11, 2016

(65) Prior Publication Data
US 2018/0278158 A1    Sep. 27, 2018

(30) Foreign Application Priority Data
Feb. 2, 2015    (CN) .......................... 2015 1 0053870

(51) Int. Cl.
*H02M 3/158* (2006.01)
*H02M 3/07* (2006.01)
(Continued)

(52) U.S. Cl.
CPC ............. *H02M 3/07* (2013.01); *H02J 7/0013* (2013.01); *H02M 3/158* (2013.01); *H02J 7/345* (2013.01)

(58) Field of Classification Search
None
See application file for complete search history.

(56) References Cited

U.S. PATENT DOCUMENTS

2008/0211316 A1    9/2008   Watanabe et al.
2011/0012543 A1    1/2011   Takizawa et al.
(Continued)

FOREIGN PATENT DOCUMENTS

CN    103151937    6/2013
CN    103414338    11/2013

OTHER PUBLICATIONS

International Search Report; corresponding to International Application No. PCT/CN2016/071551; dated May 20, 2016; 2 Pages.
(Continued)

*Primary Examiner* — Jeffrey A Gblende
(74) *Attorney, Agent, or Firm* — Ward and Smith, P.A.

(57) ABSTRACT

The present invention provides a bidirectional DC-DC converter. The bidirectional DC-DC converter includes a first switching tube connected in antiparallel to a first diode; a second switching tube connected in antiparallel to a second diode; a third switching tube connected in antiparallel to a third diode; a fourth switching tube connected in antiparallel to a fourth diode; and a first inductor and a second inductor, where an anode of the first diode and a cathode of the second diode are connected to form a first node, an anode of the second diode and a cathode of the third diode are connected to a neutral point, an anode of the third diode and a cathode of the fourth diode are connected to form a second node, and one end of the first inductor and one end of the second inductor are respectively connected to the first node and the
(Continued)

second node. The bidirectional DC-DC converter in the present invention has high conversion efficiency.

16 Claims, 5 Drawing Sheets

(51) Int. Cl.
*H02J 7/00* (2006.01)
*H02J 7/34* (2006.01)

(56) References Cited

U.S. PATENT DOCUMENTS

| | | | |
|---|---|---|---|
| 2011/0049991 A1 | 3/2011 | Sato et al. | |
| 2012/0120698 A1* | 5/2012 | Viitanen | H02M 7/003 363/126 |
| 2012/0249111 A1 | 10/2012 | Guo | |
| 2012/0319664 A1* | 12/2012 | Fujii | H02M 3/1588 323/271 |
| 2013/0094260 A1* | 4/2013 | Martini | H02M 7/483 363/97 |
| 2013/0270917 A1* | 10/2013 | Yatsu | H02J 1/00 307/77 |
| 2014/0198536 A1* | 7/2014 | Fu | H02M 3/33546 363/17 |
| 2014/0268959 A1* | 9/2014 | Frohman | H02M 7/797 363/98 |
| 2014/0292303 A1 | 10/2014 | Zubita et al. | |
| 2016/0043659 A1* | 2/2016 | Xu | H02M 1/088 363/131 |

OTHER PUBLICATIONS

Supplementary European Search Report; corresponding to EP Application No. 16746074.0; dated Aug. 28, 2018 (4 pages).

Grbovic et al., *A Bidirectional Three-Level DC-DC Converter for the Ultracapacitor Applications*, IEEE Transactions on Industrial Electronics, vol. 57, No. 10, Oct. 1, 2010; pages (16 pages).

* cited by examiner

BIDIRECTIONAL DC-DC CONVERTER

STATEMENT OF PRIORITY

The present application is a 35 U.S.C. § 371 national phase application of PCT International Application No. PCT/US2016/071551, having an international filing date of Jan. 21, 2016, and claiming priority to Chinese Patent Application No. 201510053870X filed Feb. 2, 2015, the disclosures of which are hereby incorporated herein by reference in their entireties. The above PCT International Application was published in the English language and has International Publication No. WO 2016/124079 A1.

TECHNICAL FIELD

The present invention relates to a DC-DC converter, and in particular, to a bidirectional DC-DC converter.

BACKGROUND

A bidirectional DC-DC converter is an electrical device widely applied to uninterruptible power supplies. An input end of a bidirectional DC-DC converter is connected to a rechargeable battery, and an output end of the bidirectional DC-DC converter is connected to positive and negative direct-current buses in an uninterruptible power supply. The bidirectional DC-DC converter may boost the voltage of a direct current of the rechargeable battery and then provide it to the positive and negative direct-current buses; or may use a direct current on the positive and negative direct-current buses to charge the rechargeable battery.

The voltage between positive and negative direct-current buses in uninterruptible power supplies commonly used now is about 700 volts. High-voltage battery boxes and low-voltage battery boxes are now provided on the market. For example, the output voltage of high-voltage battery boxes is 320 V to 550 V, and the output voltage of low-voltage battery boxes is 140 V to 320 V. When a high-voltage battery box is selected for use, a boost ratio of the bidirectional DC-DC converter is between 1.273 and 2.188 (less than 2.5), thus achieving high conversion efficiency. However, when a low-voltage battery box is selected for use, a boost ratio of the bidirectional DC-DC converter is between 2.188 and 5, causing decrease of the conversion efficiency. In order to solve the problem of excessively large boost ratio, two-stage boosting needs to be adopted, and another bidirectional DC-DC converter is usually connected between the output end of the bidirectional DC-DC converter and the positive and negative direct-current buses.

On one hand, another bidirectional DC-DC converter increases costs of the uninterruptible power supply. On the other hand, when a high-voltage battery box is selected for use, the added bidirectional DC-DC converter becomes redundant.

SUMMARY OF THE INVENTION

Accordingly, the technical problem to be solved by the present invention is to provide a bidirectional DC-DC converter that can select to use a rechargeable battery having a large output voltage range.

An embodiment of the present invention provides a bidirectional DC-DC converter, which includes:

a first switching tube connected in antiparallel to a first diode;

a second switching tube connected in antiparallel to a second diode;

a third switching tube connected in antiparallel to a third diode;

a fourth switching tube connected in antiparallel to a fourth diode; and a first inductor and a second inductor, where an anode of the first diode and a cathode of the second diode are connected to form a first node, an anode of the second diode and a cathode of the third diode are connected to a neutral point, an anode of the third diode and a cathode of the fourth diode are connected to form a second node, and one end of the first inductor and one end of the second inductor are respectively connected to the first node and the second node.

Preferably, the bidirectional DC-DC converter further includes a rechargeable battery connected between the other end of the first inductor and the other end of the second inductor.

Preferably, the bidirectional DC-DC converter further includes a filter capacitor connected in parallel to the rechargeable battery.

Preferably, the bidirectional DC-DC converter further includes a first energy storage capacitor and a second energy storage capacitor, one end of the first energy storage capacitor and one end of the second energy storage capacitor are connected to the neutral point, the other end of the first energy storage capacitor is connected to a cathode of the first diode, and the other end of the second energy storage capacitor is connected to an anode of the fourth diode.

Preferably, the bidirectional DC-DC converter further includes a pulse-width modulation controller, used for controlling the first switching tube and the fourth switching tube to be off, and controlling the second switching tube and the third switching tube to alternately perform the following two steps:

1) controlling the third switching tube to be on and the second switching tube to work in a pulse-width modulation mode, so that the rechargeable battery discharges and charges the first energy storage capacitor; and 2) controlling the second switching tube to be on and the third switching tube to work in a pulse-width modulation mode, so that the rechargeable battery discharges and charges the second energy storage capacitor.

Preferably, the bidirectional DC-DC converter further includes a pulse-width modulation controller, used for controlling the second switching tube and the third switching tube to be off, and controlling the first switching tube and the fourth switching tube to work in the same pulse-width modulation mode, so that the first energy storage capacitor and the second energy storage capacitor simultaneously discharge and charge the rechargeable battery.

Preferably, the bidirectional DC-DC converter further includes a pulse-width modulation controller, used for controlling the first switching tube, the second switching tube, the third switching tube, and the fourth switching tube to alternately perform the following two steps:

1) controlling the second switching tube and the fourth switching tube to be off, and controlling the first switching tube to work in a pulse-width modulation mode, so that the first energy storage capacitor discharges and charges the rechargeable battery; and 2) controlling the first switching tube and the third switching tube to be off, and controlling the fourth switching tube to work in a pulse-width modulation mode, so that the second energy storage capacitor discharges and charges the rechargeable battery.

Preferably, the bidirectional DC-DC converter further includes a pulse-width modulation controller, used for controlling the first switching tube and the fourth switching tube to be off, and controlling the second switching tube and the third switching tube to work in the same pulse-width modulation mode, so that the rechargeable battery discharges and charges the first energy storage capacitor and the second energy storage capacitor simultaneously.

Preferably, the bidirectional DC-DC converter further includes a fifth switching tube connected in antiparallel to a fifth diode, and a cathode and an anode of the fifth diode are respectively connected to the first node and the second node.

Preferably, the bidirectional DC-DC converter further includes a pulse-width modulation controller, used for controlling the first switching tube and the fourth switching tube to be off, controlling the fifth switching tube to work in a pulse-width modulation mode, and controlling the second switching tube and the third switching tube to alternately perform the following two steps:

1) controlling the second switching tube to be off and the third switching tube to be on, so that the rechargeable battery discharges and charges the first energy storage capacitor; and 2) controlling the second switching tube to be on and the third switching tube to be off, so that the rechargeable battery discharges and charges the second energy storage capacitor.

Preferably, the bidirectional DC-DC converter further includes a pulse-width modulation controller, used for controlling the second switching tube, the third switching tube, and the fifth switching tube to be off, and controlling the first switching tube and the fourth switching tube to work in the same pulse-width modulation mode, so that the first energy storage capacitor and the second energy storage capacitor simultaneously discharge and charge the rechargeable battery.

Preferably, the bidirectional DC-DC converter further includes a pulse-width modulation controller, used for controlling the first switching tube, the second switching tube, the third switching tube, and the fourth switching tube to be off, and controlling the fifth switching tube to work in a pulse-width modulation mode, so that the rechargeable battery discharges and charges the first energy storage capacitor and the second energy storage capacitor simultaneously.

The bidirectional DC-DC converter in the present invention can boost direct-current voltages in different ranges provided by the rechargeable battery into a required direct-current voltage.

BRIEF DESCRIPTION OF THE DRAWINGS

The embodiments of the present invention are further described below with reference to the accompanying drawings, in which.

DETAILED DESCRIPTION OF THE EMBODIMENTS

In order to make the objectives, technical solutions and advantages of the present invention more clear, the present invention is further described in detail below through specific embodiments with reference to the accompanying drawings.

In order to facilitate understanding of the principles of realizing voltage boosting and bucking by a bidirectional DC-DC converter in the present invention, working principles of a classical Boost circuit and a classical Buck circuit in the prior art are first introduced briefly.

Figure 1:
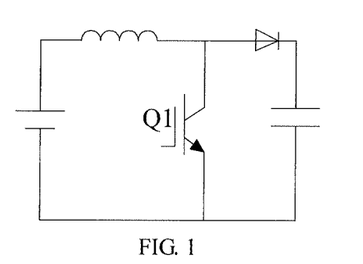
FIG. 1 is a circuit diagram of a Boost circuit in the prior art.

FIG. 1 is a circuit diagram of a Boost circuit in the prior art. A switching tube Q1 in the Boost circuit is controlled to work in a pulse-width modulation mode (that is, the switching tube Q1 alternately turns on and off at high frequencies), so as to realize a required output voltage higher than an input voltage.

Figure 2:
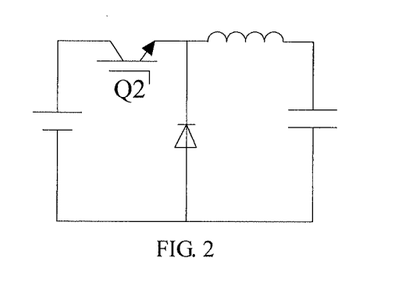
FIG. 2 is a circuit diagram of a Buck circuit in the prior art.

FIG. 2 is a circuit diagram of a Buck circuit in the prior art. A switching tube Q2 in the Buck circuit is controlled to work in a pulse-width modulation mode (that is, the switching tube Q2 alternately turns on and off at high frequencies), so as to realize a required output voltage lower than an input voltage.

Figure 3:
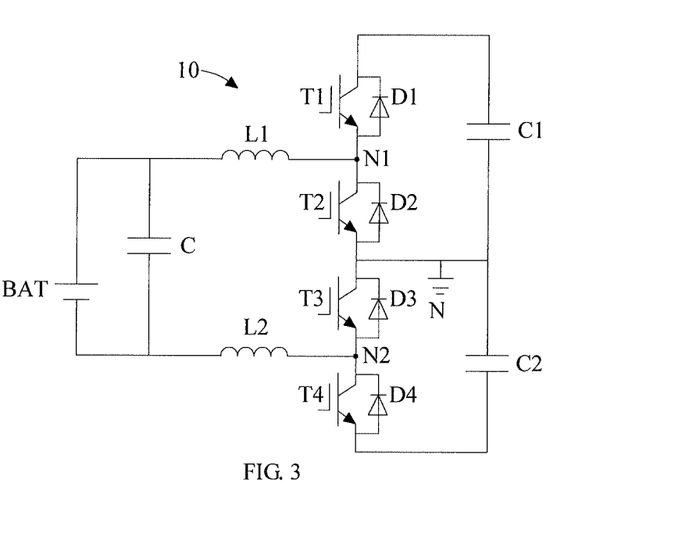
FIG. 3 is a circuit diagram of a bidirectional DC-DC converter according to a first embodiment of the present invention connected to a rechargeable battery and energy storage capacitors between positive and negative direct-current buses.

FIG. 3 is a circuit diagram of a bidirectional DC-DC converter according to a preferred embodiment of the present invention connected to a rechargeable battery and energy storage capacitors between positive and negative direct-current buses. As shown in FIG. 3, the bidirectional DC-DC converter 10 includes a filter capacitor C, an inductor L1, an inductor L2, and insulated gate bipolar transistors T1, T2, T3, and T4 respectively connected in antiparallel to diodes D1, D2, D3, and D4.

An anode of the diode D1 and a cathode of the diode D2 are connected to form a node N1, an anode of the diode D2 and a cathode of the diode D3 are connected to a neutral point N, and an anode of the diode D3 and a cathode of the diode D4 are connected to form a node N2. One end of the inductor L1 and one end of the inductor L2 are respectively connected to the nodes N1 and N2, and the other end of the inductor L1 and the other end of the inductor L2 are connected to two ends of the filter capacitor C.

The rechargeable battery BAT is connected in parallel to the filter capacitor C. One end of an energy storage capacitor C1 and one end of an energy storage capacitor C2 are connected to the neutral point N, and the other end of the energy storage capacitor C1 and the other end of the energy storage capacitor C2 are respectively connected to a cathode of the diode D1 and an anode of the diode D4.

In another embodiment of the present invention, the bidirectional DC-DC converter 10 further includes a pulse-width modulation controller (not shown in FIG. 3). For a person skilled in the art, pulse-width modulation signals with a required duty ratio may be provided to the switching tubes using an existing generation method (for example, a software generation method) based on an existing pulse-width modulation controller (for example, an MCS-51 single-chip microcomputer).

The advantages of the bidirectional DC-DC converter 10 will be described below with reference to the working mode and equivalent circuit of the bidirectional DC-DC converter 10. It is assumed that the voltage required at two ends of each of the energy storage capacitors C1 and C2 is 350 volts.

Figure 4:
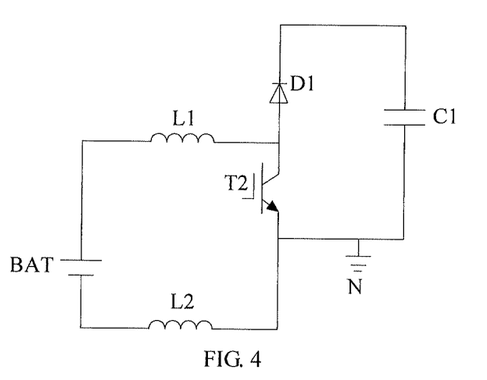
FIG. 4 and FIG. 5 are equivalent circuit diagrams of the bidirectional DC-DC converter shown in FIG. 3 in a first discharging mode.
Figure 5:
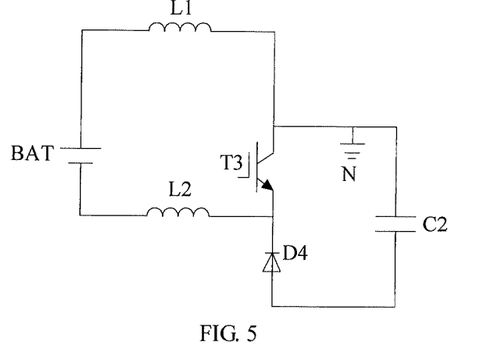

When the voltage of the rechargeable battery BAT is between 140 volts and 320 volts, a discharging mode of the rechargeable battery BAT is: controlling the insulated gate bipolar transistors T1 and T4 to be off, and controlling the insulated gate bipolar transistors T2 and T3 to perform the following two steps alternately at a predetermined cycle (for example, 0.02 second):

(1) controlling the insulated gate bipolar transistor T3 to be on and the insulated gate bipolar transistor T2 to work in a pulse-width modulation mode, where the formed equivalent circuit diagram is shown in FIG. 4, and the insulated gate bipolar transistor T2 in FIG. 4 is equivalent to the switching tube Q1 in the Boost circuit, so that the rechargeable battery BAT discharges and charges the energy storage capacitor C1, and the boost ratio is 1.09 to 2.5, thus achieving high conversion efficiency; and (2) controlling the insulated gate bipolar transistor T2 to be on and the insulated gate bipolar transistor T3 to work in a pulse-width modulation mode, where the formed equivalent circuit diagram is shown in FIG. 5, and the insulated gate bipolar transistor T3 in FIG. 5 is equivalent to the switching tube Q1 in the Boost circuit, so that the rechargeable battery BAT discharges and charges the energy storage capacitor C2, and the boost ratio is 1.09 to 2.5, thus achieving high conversion efficiency.

When the bidirectional DC-DC converter 10 is applied to an uninterruptible power supply, the aforementioned "predetermined cycle" may be the same as the cycle of an alternating current output by the uninterruptible power supply, and is not limited to 0.02 second herein.

Figure 6:
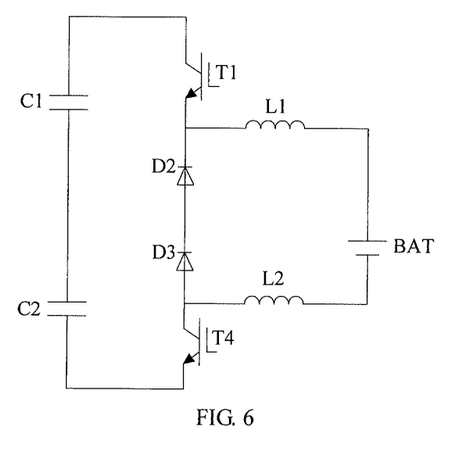
FIG. 6 is an equivalent circuit diagram of the bidirectional DC-DC converter shown in FIG. 3 in a first charging mode.

When the voltage of the rechargeable battery BAT is between 140 volts and 320 volts, a first charging mode of the rechargeable battery BAT is:

controlling the insulated gate bipolar transistors T2 and T3 to be off, and controlling the insulated gate bipolar transistors T1 and T4 to work in the same pulse-width modulation mode, where the formed equivalent circuit diagram is shown in FIG. 6, and the insulated gate bipolar transistors T1 and T4 in FIG. 6 are equivalent to the switching tube Q2 in the Buck circuit, so that the energy storage capacitors C1 and C2 simultaneously discharge and charge the rechargeable battery BAT.

Figure 7:
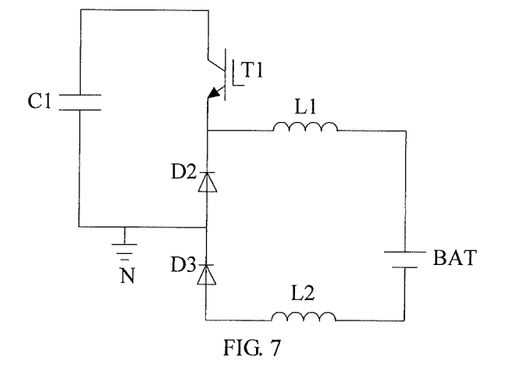
FIG. 7 and FIG. 8 are equivalent circuit diagrams of the bidirectional DC-DC converter shown in FIG. 3 in a second charging mode.
Figure 8:
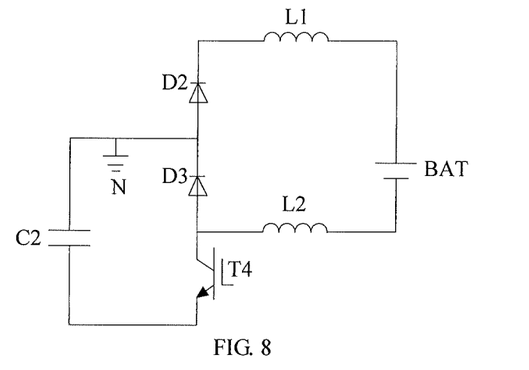

When the voltage of the rechargeable battery BAT is between 140 volts and 320 volts, a second charging mode of the rechargeable battery BAT is:

controlling the insulated gate bipolar transistors T1, T2, T3, and T4 to perform the following two steps alternately at a predetermined cycle (for example, 0.02 second):

(1) controlling the insulated gate bipolar transistors T2 and T4 to be off, the insulated gate bipolar transistor T3 to be on or off, and the insulated gate bipolar transistor T1 to work in a pulse-width modulation mode, where the formed equivalent circuit diagram is shown in FIG. 7, and the insulated gate bipolar transistor T1 in FIG. 7 is equivalent to the switching tube Q2 in the Buck circuit, so that the energy storage capacitor C1 discharges and charges the rechargeable battery BAT; and (2) controlling the insulated gate bipolar transistors T1 and T3 to be off, the insulated gate bipolar transistor T2 to be on or off, and the insulated gate bipolar transistor T4 to work in a pulse-width modulation mode, where the formed equivalent circuit diagram is shown in FIG. 8, and the insulated gate bipolar transistor T4 in FIG. 8 is equivalent to the switching tube Q2 in the Buck circuit, so that the energy storage capacitor C2 discharges and charges the rechargeable battery BAT.

When the bidirectional DC-DC converter 10 is applied to an uninterruptible power supply, the aforementioned "predetermined cycle" may be the same as the cycle of an alternating current output by the uninterruptible power supply, and is not limited to 0.02 seconds herein.

Figure 9:
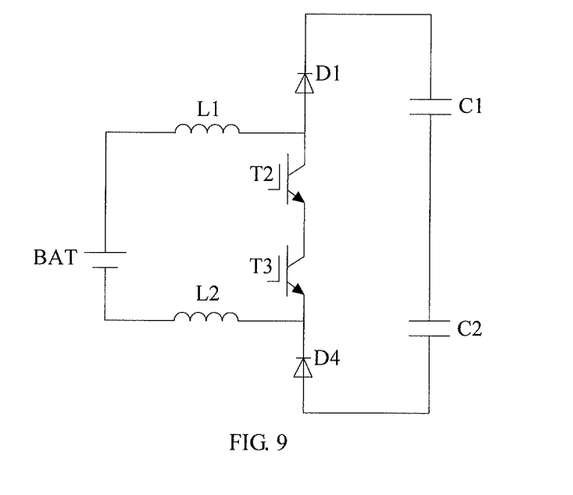
FIG. 9 is an equivalent circuit diagram of the bidirectional DC-DC converter shown in FIG. 3 in a second discharging mode.

When the voltage of the rechargeable battery BAT is between 320 volts and 550 volts, the discharging mode of the rechargeable battery BAT is:

controlling the insulated gate bipolar transistors T1 and T4 to be off and the insulated gate bipolar transistors T2 and T3 to work in the same pulse-width modulation mode, where the formed equivalent circuit diagram is shown in FIG. 9, and the insulated gate bipolar transistors T2 and T3 in FIG. 9 are equivalent to the switching tube Q1 in the Boost circuit, so that the rechargeable battery BAT discharges and charges the energy storage capacitors C1 and C2 simultaneously, and the boost ratio of the bidirectional DC-DC converter 10 is 1.27 to 2.19, thus achieving high conversion efficiency.

When the voltage of the rechargeable battery BAT is between 320 volts and 550 volts, the charging mode of the rechargeable battery BAT is: the mode of charging the rechargeable battery BAT by the direct-current buses is the same as the first charging mode when the voltage of the rechargeable battery BAT is between 140 volts and 320 volts, and will not be described herein again.

It can be known according to the aforementioned working mode of the bidirectional DC-DC converter 10 that when the voltage of the rechargeable battery BAT is between 140 volts and 320 volts or between 320 volts and 550 volts, the boost ratio of the bidirectional DC-DC converter 10 is less than 2.5, and only one-stage DC-DC conversion is adopted.

Figure 10:
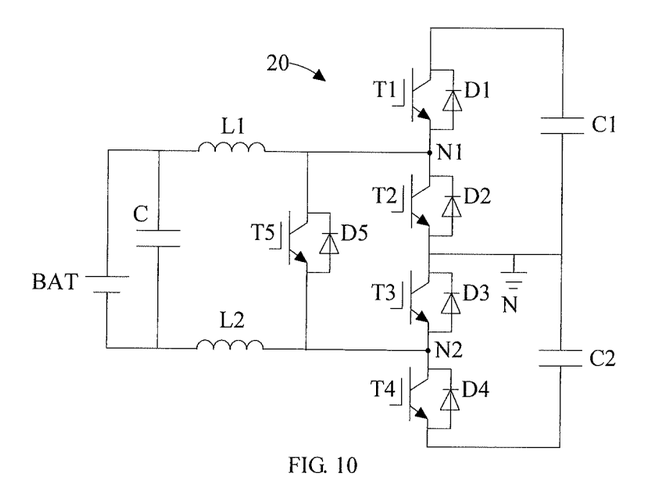
FIG. 10 is a circuit diagram of a bidirectional DC-DC converter according to a second embodiment of the present invention connected to a rechargeable battery and energy storage capacitors between positive and negative direct-current buses.

FIG. 10 is a circuit diagram of a bidirectional DC-DC converter according to a second embodiment of the present invention connected to a rechargeable battery and energy storage capacitors between positive and negative direct-current buses. The bidirectional DC-DC converter 20 is substantially the same as the bidirectional DC-DC converter 10 shown in FIG. 3, and the difference lies in that the bidirectional DC-DC converter 20 further includes an insulated gate bipolar transistor T5 connected in antiparallel to a diode D5. A cathode and an anode of the diode D5 are respectively connected to the nodes N1 and N2.

In another embodiment of the present invention, the bidirectional DC-DC converter 20 further includes a pulse-width modulation controller (not shown in FIG. 10). For a person skilled in the art, pulse-width modulation signals with a required duty ratio may be provided to the switching tubes using an existing generation method (for example, a software generation method) based on an existing pulse-width modulation controller (for example, an MCS-51 single-chip microcomputer).

The advantages of the bidirectional DC-DC converter 20 will be described below with reference to the working mode and equivalent circuit of the bidirectional DC-DC converter 20. Similarly, it is assumed that the voltage required at two ends of each of the energy storage capacitors C1 and C2 is 350 volts.

Figure 11:
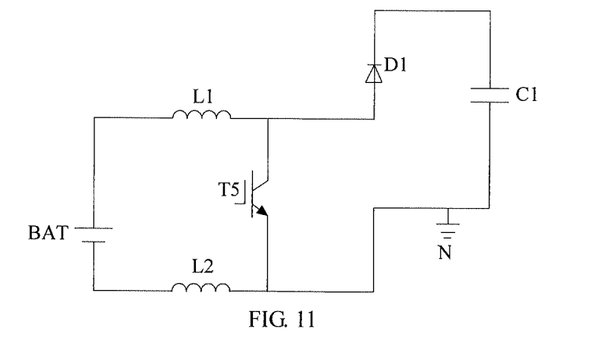
FIG. 11 and FIG. 12 are equivalent circuit diagrams of the bidirectional DC-DC converter shown in FIG. 10 in a first discharging mode.
Figure 12:
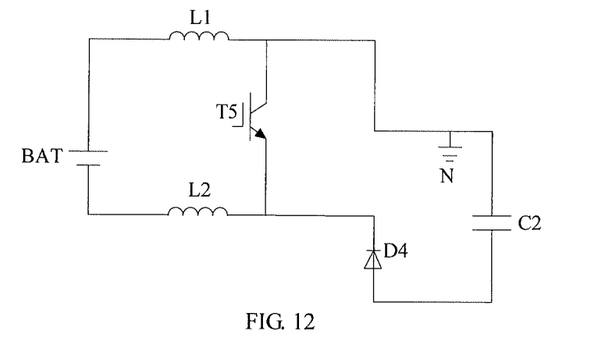

When the voltage of the rechargeable battery BAT is between 140 volts and 320 volts, a discharging mode of the rechargeable battery BAT is: controlling the insulated gate bipolar transistors T1 and T4 to be off, controlling the insulated gate bipolar transistor T5 to work in a pulse-width modulation mode, and controlling the insulated gate bipolar transistors T2 and T3 to perform the following two steps alternately at a predetermined cycle (for example, 0.02 second):

(1) controlling the insulated gate bipolar transistor T2 to be off and the insulated gate bipolar transistor T3 to be on, where the formed equivalent circuit diagram is shown in FIG. 11, and the insulated gate bipolar transistor T5 in FIG. 11 is equivalent to the switching tube Q1 in the Boost circuit, so that the rechargeable battery BAT discharges and charges the energy storage capacitor C1, and the boost ratio is 1.09 to 2.5, thus achieving high conversion efficiency; and (2) controlling the insulated gate bipolar transistor T2 to be on and the insulated gate bipolar transistor T3 to be off, where the formed equivalent circuit diagram is shown in FIG. 12, and the insulated gate bipolar transistor T5 in FIG. 12 is equivalent to the switching tube Q1 in the Boost circuit, so that the rechargeable battery BAT discharges and charges the energy storage capacitor C2, and the boost ratio is 1.09 to 2.5, thus achieving high conversion efficiency.

When the bidirectional DC-DC converter 20 is applied to an uninterruptible power supply, the aforementioned "predetermined cycle" may be the same as the cycle of an alternating current output by the uninterruptible power supply, and is not limited to 0.02 seconds herein.

It can be known with reference to FIG. 11 and FIG. 12 that when the insulated gate bipolar transistor T5 turns on, the conducting loop is "positive pole of rechargeable battery BAT—inductor L1—insulated gate bipolar transistor T5—inductor L2—negative pole of rechargeable battery BAT". In addition, it can be known with reference to FIG. 4 and FIG. 5 that when the insulated gate bipolar transistor T2 or T3 turns on, the conducting loop is "positive pole of rechargeable battery BAT—inductor L1—insulated gate bipolar transistor T2—insulated gate bipolar transistor T3—inductor L2—negative pole of rechargeable battery BAT". Since the impedance of the insulated gate bipolar transistor T5 is smaller than the sum of the impedances of the insulated gate bipolar transistors T2 and T3, the discharging mode in FIG. 11 and FIG. 12 has increased conversion efficiency as compared with the discharging mode in FIG. 4 and FIG. 5. In addition, because of the existence of the insulated gate bipolar transistor T5, parasitic inductance on the conducting loop is reduced as compared with that of the insulated gate bipolar transistors T2 and T3, and the insulated gate bipolar transistor T2 or T3 turns on or off at power frequencies, so that the spike voltage is reduced, thereby effectively protecting the bidirectional DC-DC converter 20.

Figure 13:
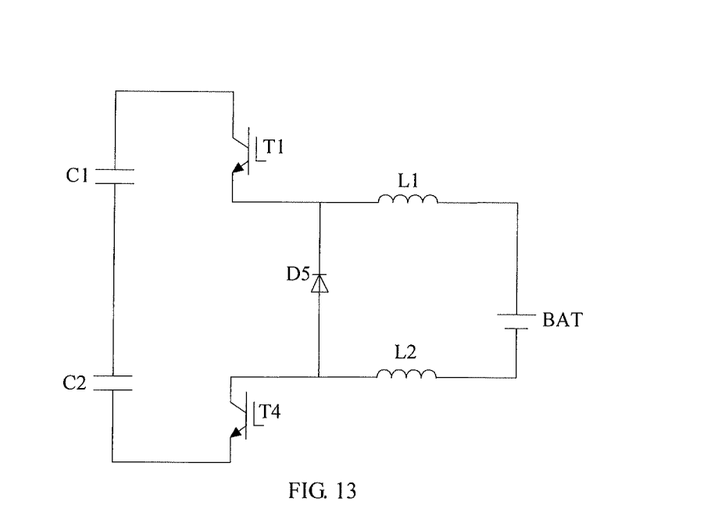
FIG. 13 is an equivalent circuit diagram of the bidirectional DC-DC converter shown in FIG. 10 in a charging mode.

When the voltage of the rechargeable battery BAT is between 140 volts and 320 volts, a charging mode of the rechargeable battery BAT is:

controlling the insulated gate bipolar transistors T2, T3, and T5 to be off and the insulated gate bipolar transistors T1 and T4 to work in the same pulse-width modulation mode, where the formed equivalent circuit diagram is shown in FIG. 13, and the insulated gate bipolar transistors T1 and T4 in FIG. 13 are equivalent to the switching tube Q2 in the Buck circuit, so that the energy storage capacitors C1 and C2 discharge and charge the rechargeable battery BAT.

Figure 14:
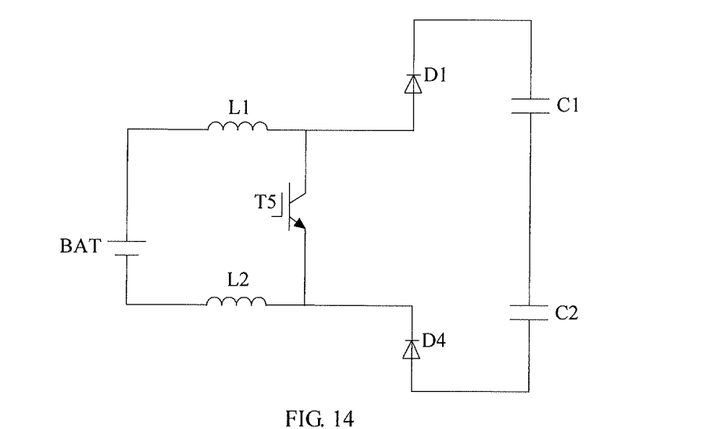
FIG. 14 is an equivalent circuit diagram of the bidirectional DC-DC converter shown in FIG. 10 in a second charging mode.

When the voltage of the rechargeable battery BAT is between 320 volts and 550 volts, the discharging mode of the rechargeable battery BAT is:

controlling the insulated gate bipolar transistors T1, T2, T3, and T4 to be off and the insulated gate bipolar transistor T5 to work in a pulse-width modulation mode, where the formed equivalent circuit diagram is shown in FIG. 14, and the insulated gate bipolar transistor T5 in FIG. 14 is equivalent to the switching tube Q1 in the Boost circuit, so that the rechargeable battery BAT discharges and charges the energy storage capacitors C1 and C2 simultaneously, and the boost ratio of the bidirectional DC-DC converter 20 is 1.27 to 2.19, thus achieving high conversion efficiency.

When the voltage of the rechargeable battery BAT is between 320 volts and 550 volts, the charging mode of the rechargeable battery BAT is the same as the charging mode when the voltage of the rechargeable battery BAT is between 140 volts and 320 volts, and will not be described herein again.

It can be known according to the aforementioned working mode of the bidirectional DC-DC converter 20 that when the voltage of the rechargeable battery BAT is between 140 volts and 320 volts or between 320 volts and 550 volts, the boost ratio of the bidirectional DC-DC converter 20 is less than 2.5, and only one-stage DC-DC conversion is adopted.

By means of the bidirectional DC-DC converter in the present invention, a rechargeable battery BAT having a large output voltage range can be selected for use. A person skilled in the art can know that the output voltage range of the rechargeable battery selected by the bidirectional DC-DC converter in the present invention is not limited to 140 volts to 320 volts or 320 volts to 550 volts. For example, the output voltage range may be 140 volts to 350 volts or 350 volts to 550 volts, and may further be 160 volts to 275 volts or 320 volts to 550 volts. In the case that the direct-current bus voltage is not equal to 700 volts, other output voltage ranges may further be selected.

In actual application, bidirectional DC-DC converters in the present invention may be connected in parallel to realize mutual conversion between the voltage of the rechargeable battery and the voltage on the direct-current buses.

In other embodiments of the present invention, a metal-oxide-semiconductor field effect transistor (MOSFET) may further be used to replace the insulated gate bipolar transistor in the aforementioned embodiments.

The diodes D1-D5 in the present invention may be parasitic antiparallel diodes of corresponding switching tubes, or may be additional antiparallel diodes.

The filter capacitor C of the present invention is used for filtering high-frequency switching ripple currents, so as to protect the rechargeable battery BAT.

The bidirectional DC-DC converter 10, 20 in the present invention only requires a single-battery device and does not require a dual-battery configuration, that is, requires only one rechargeable battery device connected between the inductors L1 and L2, thus saving costs. In addition, as compared with a bidirectional DC-DC converter constituted by two-stage inverters, the number of switching tubes is reduced, and no transformer exists, thus saving costs.

Although the present invention has been described through preferred embodiments, the present invention is not limited to the embodiments described herein and further includes various changes and variations made without departing from the scope of the present invention.

The invention claimed is:

1. A bidirectional DC-DC converter, comprising:
   a first diode;
   a first switch connected antiparallel to the first diode;
   a second diode having a cathode connected to an anode of the first diode at a first node;
   a second switch connected antiparallel to the second diode;
   a third diode having a cathode connected to an anode of the second diode at a neutral point;
   a third switch connected antiparallel to the third diode;
   a fourth diode having a cathode connected to an anode of the third diode at a second node;
   a fourth switch connected antiparallel to the fourth diode;
   a first inductor having a first terminal connected to the first node and a second terminal configured to be connected to a first terminal of a battery;
   a second inductor having a first terminal connected to the second node and a second terminal configured to be connected to a second terminal of the battery;
   a first energy storage capacitor having a first terminal connected to a cathode of the first diode and a second terminal connected to the neutral point;
   a second energy storage capacitor having a first terminal connected to an anode of the fourth diode and second terminal connected to the neutral point; and
   a controller configured to cause the first, second, third and fourth switches to selectively operate in first and second modes based on a voltage of the battery, wherein the first and second energy storage capacitors are alternately charged from the battery in the first mode and wherein the first and second energy storage capacitors are simultaneously charged from the battery in the second mode.

2. The bidirectional DC-DC converter according to claim 1, further comprising a filter capacitor configured to be connected in parallel with the battery.

3. The bidirectional DC-DC converter according to claim 1, wherein the controller is configured to turn the first switch and the fourth switch and to cause the second switch and the third switch to alternately perform the following two steps:
   turning on the third switch and operating the second switch in a pulse-width modulation mode, so that the battery charges the first energy storage capacitor; and
   turning on the second switch and operating the third switch in a pulse-width modulation mode, so that the battery charges the second energy storage capacitor.

4. The bidirectional DC-DC converter according to claim 1, wherein the controller is configured to turn off the second switch and the third switch, and to operate the first and the fourth switch in a same pulse-width modulation mode, so that the first energy storage capacitor and the second energy storage capacitor simultaneously charge the battery.

5. The bidirectional DC-DC converter according to claim 1, wherein the controller is configured to cause the first switch, the second switch, the third switch, and the fourth switch to alternately perform the following two steps:
   turning off the second and the fourth switch and operating the first switch in a pulse-width modulation mode, so that the first energy storage capacitor charges the battery; and
   turning off the first switch and the third switch and operating the fourth switch in a pulse-width modulation mode, so that the second energy storage capacitor charges the battery.

6. The bidirectional DC-DC converter according to claim 1, wherein the controller is configured to turn off the first switch and the fourth switch and operate the second switch and the third switch in a pulse-width modulation mode, so that the battery charges the first energy storage capacitor and the second energy storage capacitor simultaneously.

7. The bidirectional DC-DC converter according to claim 1, wherein the bidirectional DC-DC converter further comprises a fifth switch connected antiparallel to a fifth diode, and a cathode and an anode of the fifth diode are respectively connected to the first node and the second node.

8. The bidirectional DC-DC converter according to claim 7, wherein the controller is configured to turn off the first and the fourth switch, to operate the fifth switch to work in a pulse-width modulation mode, and to cause the second switch and the third switch to alternately perform the following two steps:
   turning off the second switch and turning on the third switch, so that the battery charges the first energy storage capacitor; and
   turning on the second switch and turning off the third switch, so that the battery charges the second energy storage capacitor.

9. The bidirectional DC-DC converter according to claim 7, wherein the controller is configured to turn off the second switch, the third switch, and the fifth switch and to operate the first switch and the fourth switch in a pulse-width modulation mode, so that the first energy storage capacitor and the second energy storage capacitor simultaneously charge the battery.

10. The bidirectional DC-DC converter according to claim 7, wherein controller is configured to turn off the first switch, the second switch, the third switch, and the fourth switch and to operate the fifth switch in a pulse-width modulation mode, so that the battery charges the first energy storage capacitor and the second energy storage capacitor simultaneously.

11. A DC-DC converter comprising:
   first and second ports;
   first, second, third and fourth transistors coupled in series between a first terminal of the first port and a second terminal of the first port;
   first, second, third and fourth diodes coupled antiparallel to respective ones of the first, second, third and fourth transistors;
   a first inductor coupled between a first terminal of the second port and first node at which the first and second transistors are connected;
   a second inductor coupled between a second terminal of the second port and a second node at which the third and fourth transistors are connected;
   a first capacitor coupled between the first terminal of the first port and a third node at which the second and third transistors are connected;
   a second capacitor coupled between the second terminal of the first port and the third node; and
   a controller configured to operate the first, second, third and fourth transistors to provide a first mode of operation in which the first and second capacitors are alternately charged when a voltage at the second port is in a first range and a second mode of operation in which the first and second capacitors are simultaneously charged when the voltage at the second port is in a second range.

12. The DC-DC converter of claim 11, wherein the first mode of operation comprises alternately performing the following operations:
  pulse width modulating the second transistor while the first and third transistors are off to charge the first capacitor; and
  pulse width modulating the third transistor while the second and fourth transistors are off to charge the second capacitor.

13. The DC-DC converter of claim 11, wherein the second mode of operation comprise pulse width modulating the second and third transistor while the first and fourth transistors are off to simultaneously charge the first and second capacitors.

14. The DC-DC converter of claim 11, wherein the controller is configured to operate the first, second, third and fourth transistors to provide a third mode of operation in which a battery coupled to the second port is alternately charged from the first and second capacitors and a fourth mode of operation in which the battery is charged simultaneously from the first and second capacitors.

15. The DC-DC converter of claim 14, wherein the third mode of operation comprises alternately performing the following operations:
  pulse width modulating the first transistor while the second, third and fourth transistors are off to charge the battery from the first capacitor; and
  pulse width modulating the fourth transistor while the first, second and third transistors are off to charge the battery from the second capacitor.

16. The DC-DC converter of claim 14, wherein the fourth mode of operation comprises pulse width modulating the first and fourth transistors while the second and third transistors are off to simultaneously charge the battery from the first and second capacitors.

* * * * *